United States Patent [19]
Newman

[11] Patent Number: 4,955,182
[45] Date of Patent: Sep. 11, 1990

[54] ANT-RUB DEVICE AND METHOD FOR PROTECTING A HORSE'S COAT FROM DAMAGE FROM A HORSE BLANKET

[76] Inventor: Marlene Newman, 1072 St. Mathews Rd., Chester Springs, Pa. 19425

[21] Appl. No.: 487,990

[22] PCT Filed: Apr. 21, 1989

[86] PCT No.: PCT/US89/01713
§ 371 Date: Mar. 8, 1990
§ 102(e) Date: Mar. 8, 1990

[87] PCT Pub. No.: WO89/10325
PCT Pub. Date: Nov. 2, 1989

[51] Int. Cl.[5] .............................................. B68C 5/00
[52] U.S. Cl. .......................................... 54/79; 54/66
[58] Field of Search ................ 54/65, 66, 79; 119/143

[56] References Cited
U.S. PATENT DOCUMENTS

| 1,159,495 | 11/1915 | Hill | 54/79 |
| 2,103,109 | 12/1937 | De Mar | 54/79 |
| 3,211,132 | 10/1965 | Hersh | 54/79 X |
| 4,114,352 | 9/1978 | Horton et al. | 54/79 |
| 4,671,049 | 6/1987 | Benckhuijsen | 54/79 |

Primary Examiner—Robert P. Swiatek
Attorney, Agent, or Firm—Caesar, Rivise, Bernstein, Cohen & Pokotilow, Ltd.

[57] ABSTRACT

An anti-rub device (10, 100) securable to a horse for use under a horse blanket to protect a horse's coat includes a main body (12, 102) portion having a stretchable fabric for supporting a portion of a horse blanket thereon and securement means (13, 104) for securing the main body portion in tight conformity about the torso of the horse, with a portion of the main body portion (12, 102) surrounding the sides of the horse in regions of the points of the horse's front shoulders. A method of protecting the horse's coat also is disclosed.

27 Claims, 4 Drawing Sheets

ANT-RUB DEVICE AND METHOD FOR PROTECTING A HORSE'S COAT FROM DAMAGE FROM A HORSE BLANKET

FIELD OF THE INVENTION

This invention relates generally to an anti-rub device for use with animals, and more specifically to an anti-rub device for use under horse blankets, to prevent undesired wearing of the horse's coat.

BACKGROUND OF THE ART

Blankets are commonly used on horses to protect them during inclement weather. These blankets often are draped loosely over the back of the horse, and sometimes are provided with fastening means to actually secure the blanket about the girth and/or neck region of the horse.

It has been found that the relative movement which inherently occurs between the horse's body and the blanket actually causes the horse's coat or hair to be worn off, thereby creating unsightly blemishes. This problem is particularly acute at the point of the horse's front shoulders, wherein the frictional rubbing action between the horse's coat and the blanket appears to be most pronounced.

U.S. Pat. No. 3,584,436, issued to Gulyas, discloses a blanket for a horse comprising an outer layer of waterproof fabric, such as nylon, and an inner layer of a material having a texture so as to cling to the animals body, e.g., plush nylon, and a padding of heat insulating fiber, e.g., polyester fiber, interposed therebetween.

U.S. Pat. No. 3,807,136, issued to Deal, discloses a pad for preventing saddle sores, and being constructed by attaching two portions of pile fabric in a back-to-back relationship. The pad is placed between the saddle and the horse to permit the relative movements between the saddle and the animal to substantially reduce frictional movements against the hide, while permitting air circulation between the pad and the hide to facilitate moisture evaporation and cooling. The pad disclosed in Deal is loosely draped over the back of the horse, in the region which is adapted to receive the saddle.

U.S. Pat. No. 4,671,049, issued to Benckhuijsen, discloses a protective blanket for a horse. The blanket contains a synthetic foam lining which is permeable to air and which is located between two mutually movable layers of knit fabric made of a non-hydroscopic synthetic fiber material. These two layers move with respect to each other to generate static electricity to create a feeling of warmth for the animal.

U.S. Pat. No. 4,355,600, issued to Zielinski, discloses an elastic protective body suit which is intended to be used to hold a bandage against the animals body. In fact, the suit is designed so that the protective pad is adapted to be attached to the suit, rather than to the body of the animal. Principal use of this product appears to be with dogs, cats and other animals which generally tend to paw or chew at the wound or bandage.

The patents to Schwartz (U.S. Pat. No. 3,248,852); Bennett (U.S. Pat No. Des. 228,926); Smith (U.S. Pat. No. 2,006,118) and Hackett (British No. 1,579,800) all disclose devices which are intended to be worn by animals to protect them from inclement weather conditions. The Schwartz U.S. Pat No. 3,248,852 specifically teaches that the fabric should not be stretchable because such fabrics loose their insulating properties, the more they are stretched.

In summary, none of the prior art references identified above recognize the problem encountered when a horse blanket is loosely draped over a horse in direct contact with the horse's body; namely, that the relative movement between the blanket and the horse (which takes place virtually at all times that the blanket is being worn) causes the horse's coat or hair to be worn off. Moreover, none of the prior art references teach a recognition of the problem that the wearing of the horse's coat or hair is most pronounced at the point of the horse's front shoulders. Clearly, none of the prior art references identified herein suggest any solution to the problems solved by the present invention.

OBJECTS OF THE INVENTION

It is a general object of this invention to provide an anti-rub device to be used under a horse blanket, and thereby prevent the horse blanket from rubbing away the coat of the horse.

It is a more specific object of this invention to provide and anti-rub device for use under a horse blanket, which is simple to construct and easily securable to the horse.

It is still another object of this invention to provide an anti-rub device for use under a horse blanket, which is easy to adjust about the horse for the purpose of providing the desired conforming fit between the device and the horse.

It is a further object of this invention to provide an anti-rub device which can be placed in close conformity with the horse's torso, and which will not undesirably shift, fold or change its conformity with the horse as the horse moves.

It is a further object of this invention to provide a fastening means in the form of cooperating hooks and loops, for securing an anti-rub device about the torso of the horse, and wherein the hooks of the fastening means will not damage either the coat of the horse or a blanket positioned on the device.

It is a further object of this invention to provide a method of protecting the coat of a horse from undesirable frictional forces from a blanket worn by the horse.

SUMMARY OF THE INVENTION

The above and other objects of this invention are achieved by an anti-rub device securable to a horse for use under a horse blanket, wherein the device has a main body portion including a stretchable fabric having a low friction surface adapted to support and/or engage a portion of a horse blanket placed over the body of the horse. The main body portion has a passage for surrounding the neck of the horse, and when the device is secured to the horse, the main body portion extends over the withers, over the sides of the horse in the region of the point of the horse's front shoulders and around the chest of the horse in a region forwardly of the front legs. The device further includes securement means for securing the main body portion in tightfitting engagement with the horse, and for retaining the device in proper position on the horse.

In accordance with a preferred embodiment of the invention the securement means includes a surcingle tab adapted to be positioned about the barrel or girth of the horse, and a front or forwardly extending bib or tab extending from the surcingle tab and adapted to be positioned between the front legs of the horse for securement to the region of the main body portion extending around the chest of the horse.

In accordance with this invention the securement means and the main body portion can be formed as a unitary member or as separate members that are secured together. Most preferably the securement means is formed of a different color than the main body section to aid a user in properly positioning and attaching the device about the horse.

In accordance with the most preferred embodiment of this invention, the main body portion of the anti-rub device is a laminate including an inner, stretchable fabric having a low friction surface for engaging the horse and an outer, low friction fabric only partially adhered to the inner fabric and being capable of sliding on the inner fabric with little frictional resistance, to thereby permit relative movement between the fabrics of the anti-rub device for substantially reducing the transmission of frictional rubbing forces to the horse's coat, which otherwise would occur due to the inherent relative movement between a horse blanket and a horse wearing the blanket.

In the most preferred embodiment of this invention, the inner and outer fabrics employed to form the main body portion of the anti-rub device are secured together in the region adjacent the withers of the horse to prevent relative movement between the two fabrics in that region.

In accordance with the preferred embodiments of this invention, the anti-rub device includes a forward margin surrounding the horse's neck, and a rear margin surrounding the girth of the horse in a region forwardly of the horse's abdomen and immediately behind the forelegs of the horse, to thereby prevent the garment from undesirably shifting on the horse and thereby adversely affecting the close, conforming fit necessary to protect the horse's coat from being undesirably worn away by the movement of a horse blanket worn by the horse.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 1:
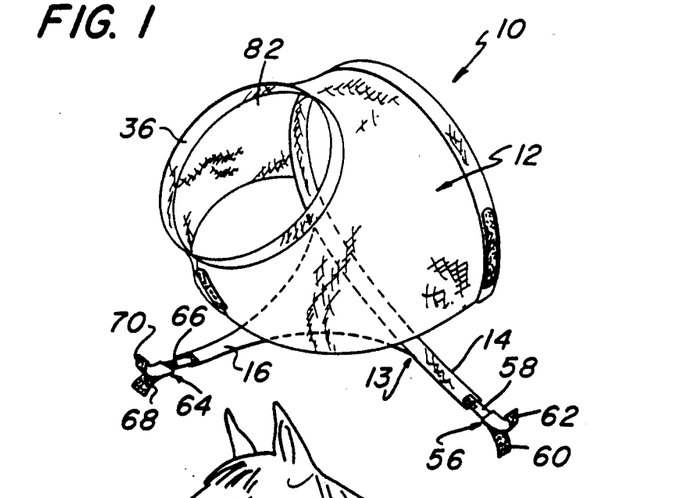
FIG. 1 is an isometric view of the anti-rub device in accordance with this invention.

Referring now in greater detail to the various figures of the drawings wherein like reference characters refer to like parts, an anti-rub device for use under a horse blanket embodying the present invention is generally shown at 10 in FIG. 1. This device basically comprises a main body portion 12 for surrounding a portion of a horse to protect the horse's hair or coat, and a securement means 13 for securing and maintaining the main body portion 12 in proper position on the horse. The securement means includes a surcingle tab 14 for extending about the barrel or girth of the horse and a second bib or tab 16 extending transversely from the surcingle tab 14 and positionable between the front legs of the horse.

Figures 2, 2A, 2B:
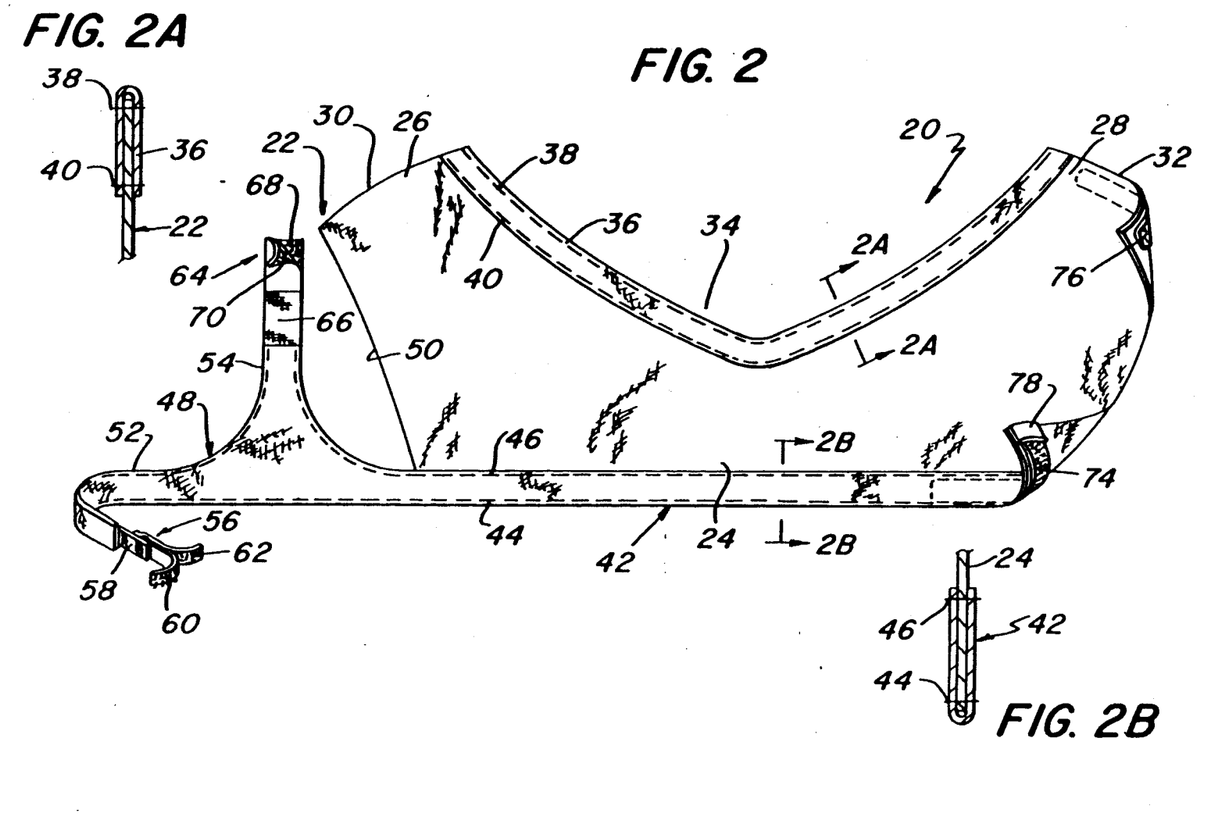
FIG. 2 is a plan view of a blank employed to form the anti-rub device shown in FIG. 1.
FIG. 2A is a sectional view taken along line 2A—2A of FIG. 2.
FIG. 2B is a sectional view taken along line 2B—2B of FIG. 2.

Turning specifically to FIG. 2, a blank 20 employed to form the anti-rub device 10 is illustrated. This blank most preferably is made from a knit fabric which is stretchable in both the warp and weft directions thereof. It is important that the surface of the fabric which is to engage the horse blanket have low friction characteristics; preferably being of a silky or satin finish. This permits the horse blanket to ride easily over the surface of the fabric, thereby greatly minimizing relative movement between the device 10 of this invention and the underlying coat of the horse. It also is desirable that the inner surface of the fabric be of a silky or satin finish, since such a finish provides a low friction interaction between the horse's body and the device, and also causes the hair of the horse to lie flat against the skin, thereby lessening the possibility that the hair will be worn off at the ends of the shafts thereof.

It also is important that the fabric be breathable, to thereby allow air to circulate through the fabric to maintain the skin of the horse in a healthy condition.

In the most preferred embodiment of this invention the fabric which is used is a knit fabric made of lycra fibers, and referred to as Spandex. However, other highly stretchable (preferably in all directions), low friction fabrics and materials can be used to form the anti-rub device of this invention.

Still referred in FIG. 2, the blank 20 from which the anti-rub device 10 is formed includes a generally U-shaped or V-shaped section 22 which is employed to form the body portion 12 of the device. This section 22 includes a base section 24 and leg sections 26 and 28. The leg sections terminate at distal edges 30 and 32, respectively. The base section 24 and leg sections 26 and 28 define a generally U or V-shaped opening 34 which, as will be described in detail hereinafter, constitutes the neck hole in the completed device 10.

As can be seen best in FIGS. 2 and 2A the edge of the blank 20 which defines the U or V-shaped opening 34 includes a stretchable, elastic band 36, which can be made of the same material as the section 22, to thereby elastize the neckline of the device 10. The elastic band 36 is secured to the section 22 by being folded over the edge thereof and then double stitched at 38 and 40 to said section in a conventional manner. The inclusion of the elastic band 36 along the neckline of the device 10 provides a close, conforming fit of the device about the base of the horse's neck.

Referring to FIGS. 2 and 2B, the blank 20 includes a securement section 42 which can be formed as a unitary extension of the U or V-shaped section 22, or, as is illustrated, preferably is formed as a separate section which is folded over the edge the base section 24 of the U or V-shaped section 22, and then secured to said base section 24 through double stitching 44 and 46 in a conventional manner. The securement section 42 preferably is of the same elastic material that is employed in the stretchable section 22 and in the elastic band 36 located around the neckline of the blank 20. The securement section 42 includes a region 48 extending transversely beyond outer edge 50 of the leg section 26. This region 48 includes a transversely extending surcingle tab section 52 and a second bib or tab section 54 generally perpendicular to said surcingle tab section. In the preferred embodiment both the surcingle tab section 52 and the bib or tab section 54 are formed of a double-thickness by the folding of the securement section as described above. It also should be noted that most preferably all of the non-folded free edges of the blank are hemmed to provided smooth, finished surfaces in the completed product.

In accordance with a preferred feature of this invention, the securement section 42 is made of a different color fabric from that of the U or V-shaped section 22, to thereby provide a visible indicator which is believed to assist the user in properly orienting the device 10 for attachment to the horse. This is most easily accomplished by forming the securement section 42 as a separate element from that of the U or V-shaped section 22.

As can be seen best in FIG. 2, the blank 20 is provided with a fastener 56 attached through an elastic web 58 to a distal end of the surcingle tab section 52. The fastener 56 includes an attachment section 60 having Velcro hooks thereon, and a protective liner 62 having Velcro loops thereon. The liner 62 is positioned over the attachment section 60 when the attachment section is not in use, such as when the device 10 is being handled to attach it to a horse, or when the device 10 is being washed or otherwise cleaned. In this manner the Velcro hooks are prevented from inadvertently attaching to undesired sections of the device 10, or to other materials with which it may come in contact.

Still referring to FIG. 2, the blank 20 includes a fastener 64 which is attached through an elastic web 66 to the distal end of the bib or tab section 54. The fastener 64 generally is the same as the fastener 56; including an attachment section 68 having Velcro hooks thereon and a protective liner 70 having Velcro loops thereon. The protective liner 70 covers the hooks of the attachment section 68 when the fastener 64 is not in use. For example, the liner 70 is secured to the attachment section 68 when the device 10 is being handled, such as when the device is being positioned on a horse, or when it is being subjected to a washing or other cleaning operation.

Figures 3, 3A:
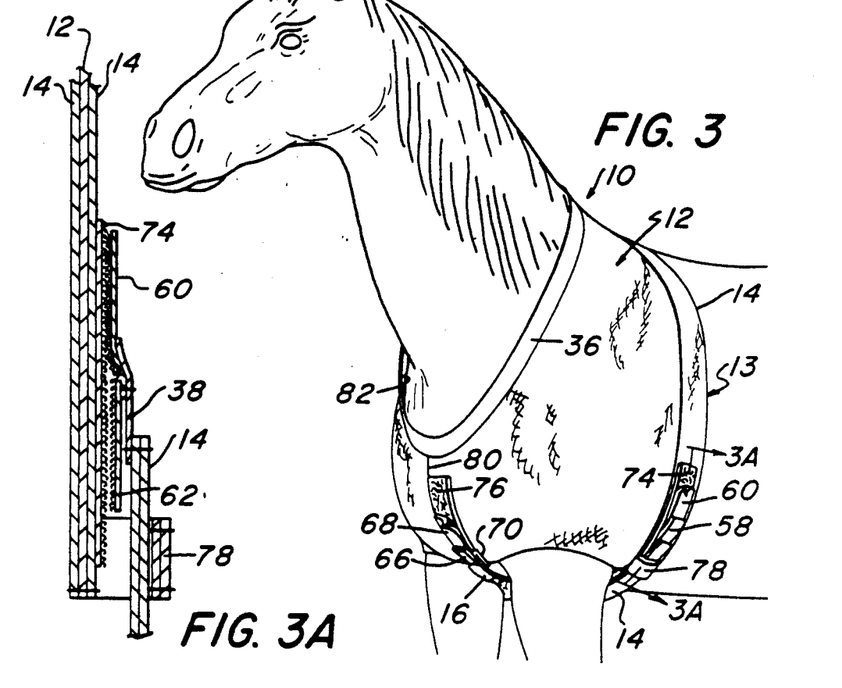
FIG. 3 is an isometric view showing the anti-rub device of this invention secured to a horse.
FIG. 3A is a sectional view taken along line 3A—3A of FIG. 3.

Referring to FIGS. 2 and 3, an attachment section 74 with Velcro loops thereon is provided for connection to the attachment section 60 of the fastener 56, when the device 10 is secured about the torso of a horse. In a similar manner an attachment section 76 having Velcro loops thereon is provided adjacent the distal end of leg section 28 of the blank 20 for connection to the attachment section 68 of the fastener 64 when the device 10 is secured about the torso of the horse. A stitched loop 78 can be provided adjacent the attachment section 74, at a transverse end of the securement section 42 remote from fastener 56, for receiving the fastener 56 therethrough when the device 10 is secured about the torso of the horse. This provides a tight fit, preventing the corner of the device 10 adjacent the attachment section 60 from pulling forward as the horse moves. When the surcingle tab 14 is positioned through the loop 78, the liner 62 of fastener 56 is folded back to permit the Velcro hooks of attachment section 60 to engage the Velcro loops of attachment section 74, as will be described in greater detail hereinafter.

Referring to FIGS. 1–3, the construction of the device 10 is completed by positioning the distal edges 30, 32 of the legs 26 and 28 of the blank 20 in overlapping relationship with each other, and then attaching these edges together with a stitched seam 80. In this manner the device 10 is provided with a continuous neck opening 82 for receiving the neck of the horse therethrough.

Referring specifically to FIGS. 3 and 3A, the device 10 is shown positioned about the torso of a horse, with the tabs 14 and 16 secured to the main body portion 12, to provide a tight, conforming fit of the device 10 about the horse. Specifically, the horse's head and neck are first inserted through the neck hole 82, with the elastic band 36 about the neckline thereof providing a close conforming fit at the base of the horse's neck. The section of the main body portion 12 in the region of the seam 80 surrounds the horse's chest in front of the horse's forward legs. The main body portion 12 also extends around the withers and sides of the horse, and overlies the point of the shoulders of the horse's front legs. As explained earlier, it is in these shoulder regions that the horse's hair or coat most commonly is worn away by rubbing contact with a horse blanket.

After the device 10 has been positioned on the horse, by inserting the horse's head through the neck opening 82 thereof, the surcingle tab 14 is pulled tightly about the girth of the horse, is inserted through the stitched loop 78 and is removably secured to the main body portion through the cooperation of the Velcro attachment sections 60 and 74. The elasticity of the main body portion 12, the surcingle tab 14 and the elastic web 58 to which the fastener 56 is attached assures that a tight, conforming fit is established about the torso of the horse. It should be noted that the protective liner 62 of the attachment means 56 is folded back to expose the Velcro hooks of the attachment section 60, preferably after the attachment means has been inserted through the loop 78.

Still referring to FIG. 3, the forwardly extending tab 16 is directed tightly against the underside of the horse between the horse's front legs, and then is connected to the section of the main body portion 12 surrounding the horse's chest through the cooperation of the Velcro fastener sections 68 and 74. As can be seen in FIG. 3, the protective liner 70 for the attachment section 68 is folded back to expose the Velcro hooks of the attachment 68 to permit its attachment to the loops of the Velcro attachment section 76.

The tab 16 employed in this invention, by virtue of being positioned between the front legs of the horse, provides a very important function of holding the device 10 in a proper position on the horse, i.e., it prevents the device from "riding up" on the horse and also from rotating on the horse's body. Moreover, the adjustments permitted by the fasteners of the surcingle tab 14 and the forwardly extending bib or tab 16 permit a device 10 of a single size to be employed with horses of different sizes and shapes, while still maintaining a tight, conforming fit.

Figures 5, 5D:
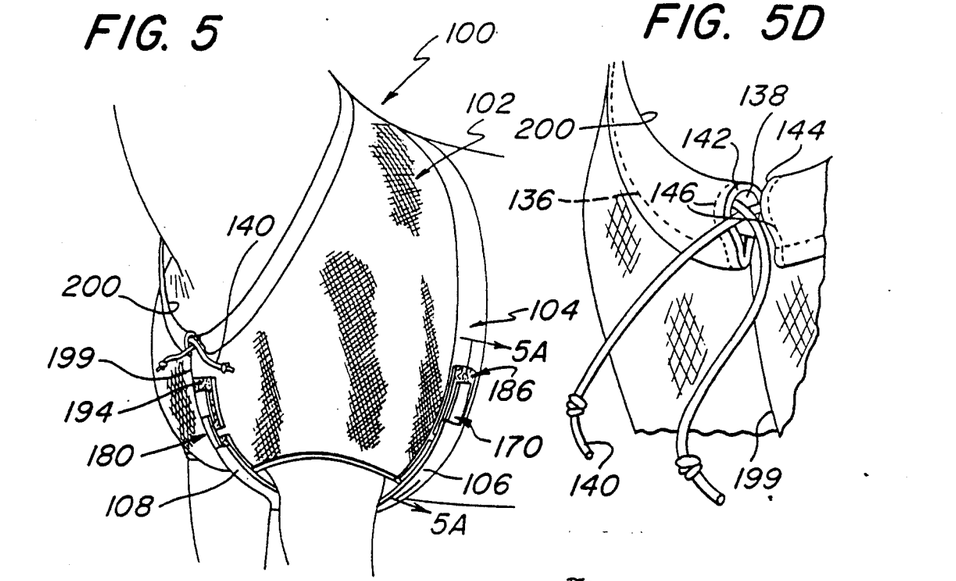
FIG. 5 is an isometric view showing the improved anti-rub device made from the blank illustrated in FIG. 4 and being secured to a horse.
FIG. 5D is an enlarged fragmentary view showing details of the anti-rub device depicted in FIG. 5, in a region encircling the neck of a horse.

Referring specifically to FIG. 5, a second, and most preferred embodiment of an anti-rub device in accordance with this invention is shown generally at 100. This device basically comprises a main body portion 102 and a securement means 104 for securing and maintaining the main body portion 102 in proper position on the horse. The securement means 104 includes a surcingle tab 106 for extending about the barrel or girth of the horse, and a second bib or tab 108 extending transversely from the surcingle tab 14 and positionable between the front legs of the horse. The main body section 102 and securement means 104 provide the same function in the anti-rub device 100 as in the anti-rub device 10 described earlier herein.

Figures 4, 4A, 5B, 5C:
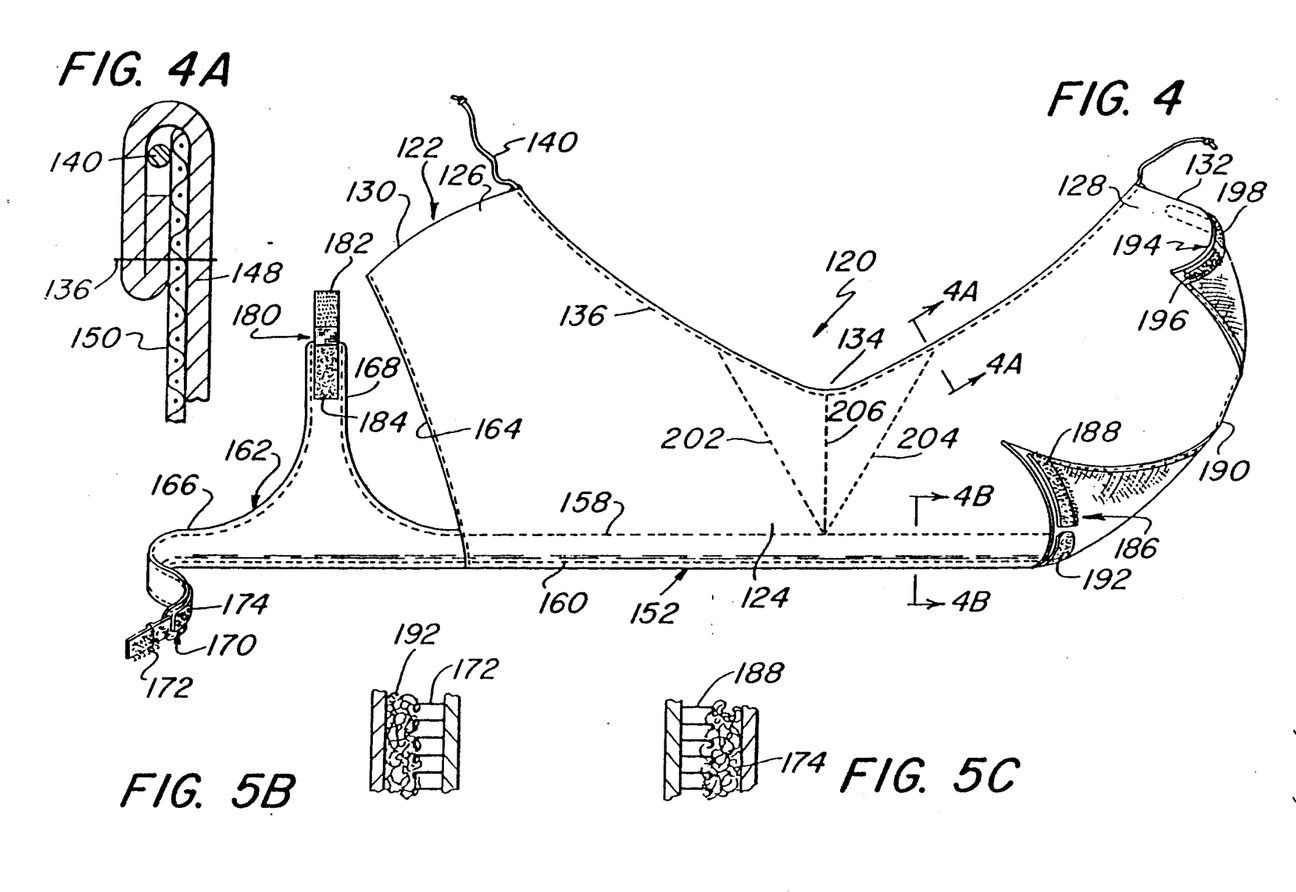
FIG. 4 is a plan view, similar to FIG. 2, of a blank employed to form the preferred anti-rub device in accordance with this invention.
FIG. 4A is a sectional view taken along line 4A—4A of FIG. 4.
FIG. 5B is an enlarged view of the circled region of FIG. 5A, identified by the legend "FIG. 5B"
FIG. 5C is an enlarged view of the circled region of FIG. 5A, identified by the legend "FIG. 5C"

Turning specifically to FIG. 4, a blank 120 employed to form the anti-rub device 100 is illustrated. This blank, like the blank 20 employed to form the anti-rub device 10, includes a generally U-shaped or V-shaped section 122 which is employed to form the body portion 102 of the device. This section 122 includes a base section 124 and leg sections 126 and 128, with the leg sections terminating at distal edges 130 and 132, respectively. The base section 124 and leg sections 126 and 128 define a generally U-shaped or V-shaped opening 134 which, as will be described in detail hereinafter, constitutes the neck hole in the completed device 100.

As can be seen best in FIGS. 4, 5 and 5D, the edge of the blank 120 which defines the opening 134 is folded over on itself, and is thereafter stitched at 136 to define a drawstring-receiving passageway 138 extending along the entire periphery of the opening 134, for receiving and retaining a drawstring 140 therethrough.

As can be seen best in FIG. 5D, each open end 142 and 144 of the passageway 138 is folded back on itself and is maintained in that condition by stitches 146 to thereby provide smooth edges which will not injure the horse.

As can be seen best in FIGS. 5 and 5D, after the anti-rub device 100 has been placed on the horse the drawstring 140 can be pulled to tighten the device 100 into close conformity with the neck region of the horse.

Referring specifically to FIGS. 4 and 4A, one of the major distinctions between this embodiment of the invention and the earlier described embodiment is that the generally U-shaped or V-shaped section 122 of the blank 120 forming the main body section 102 in this embodiment of the invention is a laminated construction. That is, the generally U-shaped or V-shaped section 122 includes two fabrics 148 and 150, both of which preferably are stretchable in both the warp and weft directions, and both of which preferably are breathable.

In the most preferred embodiment of the invention the fabric 148, which engages the coat of the horse in the completed device 100, is of the same Spandex construction employed in the device 10, as was described in detail earlier herein. In the most preferred embodiment of this invention the second fabric 150, which constitutes the outer fabric of the device, is an open mesh knit fabric made of rayon, cotton or other similar low friction material. The fabrics 148 and 150 are only partially secured to each other, in a manner which will be described in detail hereinafter, to permit a high degree of relative movement between the fabrics in desired locations relative to the horse. Applicant has found that by providing a laminated construction, wherein the plies can move relative to each other, the forces imposed upon the anti-rub device by a horse blanket sliding on the upper surface of the fabric 150 tend to be dissipated within the anti-rub device 100, and are not transmitted to the coat of the horse. This provides excellent protection for the horse's coat, particularly at the points of the horse's shoulders.

Figure 4B:
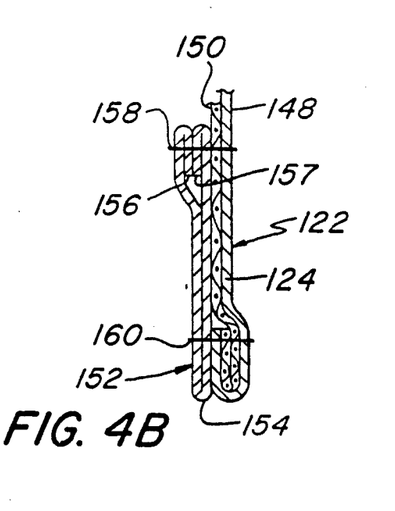
FIG. 4B is a sectional view taken along line 4B—4B of FIG. 4.

Referring to FIGS. 4 and 4B, the blank 120 includes a securement section 152 which preferably is formed separately from the U-shaped or V-shaped section 122, but is formed of the same stretchable Spandex as the fabric 148. As can be seen clearly in FIG. 4B, the securement section is of a double thickness, which is created by folding the fabric of the securement section along fold line 154. Thereafter free edges 156 and 157 are folded inwardly to present smooth, exposed edges which may come in contact with the horse's coat. The securement section 152 is attached to the base section 124 of the generally U-shaped or V-shaped section 122 by double stitching 158 and 160. This double stitching also maintains the securement section 152 in its folded arrangement, as described above.

Referring to FIG. 4, the securement section 152 includes a region 162 extending transversely beyond outer edge 164 of the leg section 126. This region 162 includes a transversely extending surcingle tab section 166 and a second bib or tab section 168 generally perpendicular to said surcingle tab section. In the preferred embodiment both the surcingle tab section 166 and the bib or tab section 168 are formed of a double thickness by the folding of the securement section as described above.

As in the case of the anti-rub device 10, the securement section 152 can be made of a different color fabric from that of the generally U-shaped or V-shaped section 122, to thereby provide a visible indicator which is believed to assist the user in properly orienting the device 10 for attachment to the horse.

As can be seen best in FIG. 4, the blank 120 is provided with an attachment section 170 which is secured to the distal end of the surcingle tab 166. This attachment section includes Velcro hooks 172 adjacent an outer distal end of the surcingle tab 166, and Velcro loops 174 spaced inwardly of the Velcro hooks 172. As a result of this arrangement, the attachment section 170 can be folded back upon itself, to secure the hooks 172 to the loops 174 when the attachment section is not in use, such as when the device 100 is being handled to attach it to a horse, or when the device is being washed or otherwise cleaned. In this manner the Velcro hooks are prevented from inadvertently attaching to undesired sections of the device 100, or to other materials with which it may come in contact. An additional advantage of this arrangement of Velcro hooks 172 and Velcro loops 174 will be described hereinafter, in conjunction with the location of these hooks and loops when the device 100 is attached to a horse.

Still referring to FIG. 4, the blank 120 includes an attachment section 180 secured to the distal end of the bib or tab section 168. This attachment section is very similar to the attachment section 170 described above, in that it includes Velcro hooks 182 at the outer distal end of the tab section 168, and Velcro loops 184 spaced inwardly from the hooks.

Figure 5A:
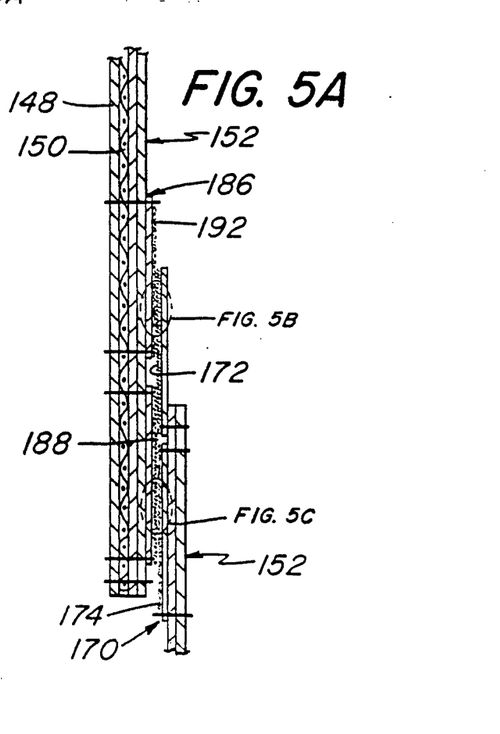
FIG. 5A is a sectional view taken along line 5A—5A of FIG. 5.

Referring to FIGS. 4 and 5A, an attachment section 186 includes Velcro hooks 188 located adjacent outer edge 190 of the leg section 128, and Velcro loops 192 adjacent the hooks 188, but paced inwardly from the outer edge 190. It should be noted that both the Velcro hooks 188 and Velcro loops 192 extend along the peripheral edge of the base section 124.

Referring to FIGS. 4 and 5, an attachment section 194 is located adjacent the distal edge 132 of the leg section 128, and includes Velcro hooks 196 extending inwardly from the outer edge 190 and Velcro loops 198 spaced inwardly from the hooks 196.

The manner in which the various attachment means cooperate with each other in the preferred anti-rub device 100 will be described in detail hereinafter. Suffice it to state at this time that the arrangement of hooks and loops provides a construction wherein the hooks are maintained out of contact with either the horse's coat or a horse blanket disposed over the device, to thereby prevent injury both to the horse and to the blanket worn by the horse.

Referring to FIGS. 4 and 5, the construction of the device 100 is completed by positioning the distal edges 130, 132 of the legs 126, and 128 of the blank 120 in overlapping relationship with each other, and then attaching these edges together with a suitable stitching to form a seam 199, in the same manner as in the earlier described construction. In this manner, the device 100 is provided with a continuous neck opening 200 for receiving the neck of the horse therethrough. Moreover, as a result of the arrangement of the drawstring 140, the size of the neck opening 200 can be adjusted to tightly conform to the horse's neck, over a wide range of sizes.

Referring to FIGS. 5 and 5A, the anti-rub device 100 is shown positioned about the torso of a horse, with the free ends of the tabs 106 and 108 secured to the main body portion 102, to provide a tight, conforming fit of the device 10 about the horse. Specifically, the horse's head and neck are first inserted through the neck opening 200, and the drawstring 140 is pulled to tighten the neck region into close conformity with the horse's neck. The section of the main body portion 102 in the region of the seam 199 surrounds the horse's chest in front of the horse's forward legs. The main body portion 102 also extends around the withers and sides of the horse, and overlies the points of the shoulders of the horse's front legs. As explained earlier, it is in these shoulder regions that the horse's hair or coat most commonly is worn away by rubbing contact with a horse blanket, when a protective device is not employed.

After the device 100 has been positioned on the horse, by inserting the horse's head through the neck opening 200 thereof, the surcingle tab 106 is pulled tightly about the girth of the horse, and the free end thereof, which includes the attachment section 170, is removably secured to the main body portion 102 through the cooperation of the attachment section 170 and attachment section 186.

Still referring to FIG. 5, the forwardly extending bib or tab 108 is directed tightly against the underside of the horse, between the horse's front legs, and then is connected to the section of the main body portion 102 surrounding the horse's chest through the cooperation of the attachment sections 180 and 194.

The tabs 106 and 108 employed in this embodiment of the invention, provide exactly the same function and benefits as the tabs 14 and 16 employed in the earlier described anti-rub device 10.

Referring specifically to FIGS. 5A, 5B and 5C, the unique, cooperative arrangement between the attachment sections 170 and 186 is illustrated. Specifically, in the illustrated embodiment a wide range of adjustments can be made about the girth of the horse, without exposing the Velcro hooks 172, 188 to either the horse's coat or to a blanket positioned on the device. In particular, it should be apparent that when the attachment sections 170 and 186 are secured to each other the entire region of the inwardly facing Velcro hooks 172 of the attachment section 170 overlies the attachment section 186, and therefor will not be exposed to the horse's coat. The only portion of the attachment section 170, which may not overly the attachment section 186 is the region containing the Velcro loops 174. However, these loops are soft and non-abrasive and will not tend to injure the horse's coat.

In a similar manner the outwardly facing Velcro hooks 188 of the attachment section 186 completely underly the attachment section 170, and therefore will not be exposed to a horse blanket positioned over the device. The only region of the attachment section 186 which may be exposed to the horse blanket, is the region containing the Velcro loops 192. As explained above, these loops are soft and non-abrasive, and therefore will not damage the horse blanket.

Referring to FIG. 5, the unique arrangement of the attachment sections 180 and 194 provides the same benefits as the arrangement of the attachment sections 170 and 186. Specifically, when the attachment sections 180 and 194 are secured to each other, the only regions of the attachment sections that are exposed to engage either a horse blanket or the horse's coat are the regions including the plush Velcro loops 184 and 198. These plush loop sections clearly will not damage either the horse's coat or the horse blanket.

Referring specifically to FIGS. 4, 4A, 4B, and 5A, the arrangement of only partially securing together the two fabrics 148 and 150 of the main body section 102 is illustrated. Specifically, the fabrics are secured together by the stitching 136 (FIGS. 4 and 4A) in the neck region, the double stitching 158 and 160, which also attaches the securement section 152 to the base 124 of the main body section 102 (FIGS. 4 and 4B) and the stitching which also is employed to secure the attachment sections 186 and 194 to the main body portion 102.

In addition, applicant has found that it is very desirable to prevent relative movement between the fabrics 148 and 150 in the region overlying the withers of the horse. To accomplish this result applicant has secured the fabrics 148 and 150 together by a series of stitch lines 202, 204, and 206. The stitch lines 202 and 204 meet at a point adjacent the base section 124 of the blank 120, and diverge from each other in a direction toward the generally U or V-shaped opening 134. These stitch lines 202 and 204 are located on opposite sides of the withers when the completed device 100 is secured to a horse. The remaining stitch line 206 generally bifurcates the angle formed between the stitch lines 202 and 204, and lies substantially along the withers of the horse in the completed device.

Applicant has found that when the fabrics 148 and 150 are permitted to move relative to each other in the region of the horse's withers, the inner fabric 148 tends to fold upon itself, thereby providing an edge which may injure the horse's coat. By employing the arrangement of stitch lines 202, 204 and 206 such relative movement is prevented, and the inner fabric 148 does not tend to fold upon itself.

Although applicant has found that the arrangement of stitch lines 202, 204 and 206 works extremely well in preventing the inner fabric 148 from folding on itself, it is believed that other stitching or binding arrangements may be employed in the region of the withers, to achieve this same beneficial result.

Without further elaboration, the foregoing will so fully illustrate my invention that others may, by applying current or future knowledge, adopt the same for use under various conditions of service.

What is claimed as the invention is:

1. An anti-rub device for protecting the coat of a horse at the points of the shoulders of the horse's front legs, said device being securable about a horse for use under a horse blanket and including:
  a. a main body portion including a stretchable fabric which is stretchable in both the warp and weft directions, said stretchable fabric having a low friction surface adapted to support a portion of a horse blanket thereon and a low friction surface for engaging the coat of the horse, said main body portion having a passage for surrounding the neck of the horse, and, being attached to said horse in a stretched condition so that said main body portion is in tight conformity with the horse in regions overlying the withers, overlying the chest of the horse in the region forward of the front legs and overlying the points of the shoulders of the horse's front legs; and
  b. securement means for securing the main body portion in a stretched condition into tight conformity with the torso of the horse in regions overlying the withers, overlying the chest of the horse in a region forward of the front legs, and overlying the points of the shoulders of the horse's front legs, whereby said low friction surfaces of said stretchable fabric and the tight conformity of the main body portion with the horse protect the coat of the horse at the points of the shoulders of the horse's front legs against chafing when a horse blanket is disposed over said anti-rub device.

2. The device of claim 1 wherein said main body portion and said securement means are formed as separate members and are secured together.

3. The device of claim 1 wherein said securement means and said main body portion are of different colors.

4. The device of claim 1 further including a stretchable bank means about the edge of said passage for providing a close conforming fit of the device about the horse's neck.

5. The device of claim 1 characterized in that said securement means includes a surcingle tab adapted to be positioned about the girth of a horse and thereafter removably attached to the main body portion, and a second tab extending generally perpendicular to said surcingle tab and adapted to be positioned between the front legs of the horse and thereafter removably secured to the section of the main body portion overlying the horse's chest.

6. The device of claim 5 wherein said surcingle tab and said second tab include fastening means for cooperating with complementary fastening means on the main body portion for permitting adjustable attachment of the surcingle tab and second tab to the main body portion.

7. The device of claim 6 wherein the fastening means included on the surcingle tab and second tab, and the complementary fastening means are hooks and loops.

8. The device of claim 7 wherein the fastening means on the surcingle tab and second tab are hooks, further including a protective liner for covering and attaching to the hooks of said surcingle tab and second tab.

9. The device of claim 8 wherein a loop means is provided adjacent the complementary fastening means for the surcingle tab for receiving the surcingle tab therethrough.

10. The device of claim 6 wherein the fastening means on the surcingle tab and on said second tab each include a set of hooks and a set of loops, and wherein the complementary fastening means on the main body portion include a set of hooks and a set of loops for attachment to the fastening means on the surcingle tab and a set of hooks and a set of loops for attachment to the fastening means of the second tab, and wherein the arrangement of the sets of hooks and loops precludes exposed hooks from facing outwardly to engage a horse blanket or facing inwardly to engage the horse when the anti-rub device is secured about the horse and a horse blanket is position on the device.

11. The anti-rub device of claim 1 wherein said main body portion includes inner and outer stretchable fabrics, said inner fabric having low friction inner and outer surfaces for engaging the horse and outer fabric, respectively, the outer fabric having low friction inner and outer surfaces for engaging the inner fabric and for engaging a horse blanket supported thereon, respectively, and fastening means only partially securing the inner and outer fabrics together for permitting relative movement between the fabrics in the region overlying the points of the shoulders of the horse's front legs for preventing injury to the horse's coat in the region of the points of the shoulders of the horse's front leg when a horse blanket is positioned on the horse.

12. The device of claim 11 wherein said inner and outer stretchable fabrics are 4-way stretchable fabrics.

13. The device of claim 12 wherein said fabrics are secured together in the region adjacent the withers of the horse, to thereby prevent relative movement of the inner and outer fabrics in the region of the withers.

14. The device of claim 12 wherein the inner and outer fabrics are secured together in regions on opposite sides of the withers of the horse.

15. The device of claim 14 wherein the inner and outer fabrics are also secured together along a line overlying the withers of the horse.

16. The device of claim 12 wherein said stretchable fabrics are attached together adjacent a forward region at the passage for surrounding the neck of the horse, adjacent a rearward region at the girth of the horse, forwardly of the horse's abdomen, and in the region extending over the withers.

17. The device of claim 11 wherein said surcingle tab and said second tab include fastening means for cooperating with complementary fastening means on the main body portion for permitting adjustable attachment of the surcingle tab and second tab to the main body portion.

18. The device of claim 17 wherein the fastening means on the surcingle tab and one said second tab each include a set of hooks and a set of loops, and wherein the complementary fastening means on the main body portion include a set of hooks and a set of loops for attachment to the fastening means on the surcingle tab and a set of hooks and a set of loops for attachment to the fastening means of the second tab, and wherein the arrangement of the sets of hooks and loops precludes exposed hooks from facing outwardly to engage a horse blanket or facing inwardly to engage the horse when the anti-rub device is secured about the horse and a horse blanket is positioned on the device.

19. An anti-rub device for protecting the coat of a horse at the points of the shoulders of the horse's front legs, said device being securable about a horse for use under a horse blanket and including:

a. a main body portion including an inner stretchable fabric and an outer stretchable fabric only partially secured to each other for permitting regions of said inner and outer fabrics in regions overlying the points of the shoulders of the horse's front legs to move relative to each other, said inner fabric having an inner, low friction surface for engaging a horse and an outer, low friction surface for engaging an inner, low friction surface of the outer fabric, said outer fabric including a low friction, outer surface for supporting a portion of a horse blanket thereon, said main body portion having a passage for surrounding the neck of the horse and being attached to said horse in a stretched condition so that said main body portion is in tight conformity with the horse in regions overlying the withers, overlying the chest of the horse in a region forward of the front legs and overlying the points of the shoulders of the horse's front legs; and b. securement means for securing the main body portion in a stretched condition into tight conformity with the torso of the horse in regions overlying the withers, overlying the chest of the horse in a region forward of the front legs, and overlying the points of the shoulders of the horse's front legs whereby the low friction surfaces of said inner and outer fabrics and the tight conformity of the main body portion with the horse protects the coat of the horse at the points of the shoulders of the horse's front legs against chafing when a horse blanket is disposed over said anti-rub device.

20. A method of protecting a horse's coat at the points of the shoulders of the horse's front legs, from frictional forces caused by a horse blanket worn by the horse; said method including the steps of:

a. stretching an anti-rub device in tight conformity about the torso of the horse with a stretched main body portion thereof engaging the horse's coat in tight conformity with the withers, with the chest of the horse in a region forward of the front legs and with the sides of the horse in regions overlying the points of the shoulder of the horse's front legs;

b. securing the stretched anti-rub device in tight conformity about the torso of the horse; and c. positioning a horse blanket over the stretched anti-rub device, whereby the anti-rub device prevents the transmission of undesired forces to the horse's coat in the region of the points of the shoulders of the horse's front legs, caused by relative movement of the horse blanket relative to the horse.

21. The method of claim 20 wherein the main body portion includes a first stretchable fabric and a second stretchable fabric formed of a material which is capable of sliding on said first fabric with low frictional resistance, said second fabric being only partially adhered to said first fabric so that regions of said second fabric overlying the points of the shoulders of the horse's front legs are free to slide relative to said first fabric, wherein the steps of securing the anti-rub device in tight conformity about the torso of the horse is carried out with the second fabric facing outwardly for directly engaging the horse blanket, whereby the permitted relative movement between the fabrics substantially reduces the transmission of frictional rubbing forces from the horse blanket to the horse's coat in the region of the points of the shoulders of the horse's front legs.

22. The method of claim 21 including the step of adhering the second fabric to the first fabric in the region of the main body portion overlying the withers to minimize relative movement between the fabrics in the region of the withers, for preventing the creasing of the first fabric in the region of said withers.

23. The method of claim 22 wherein said second fabric is a knit, open mesh fabric.

24. The method of claim 21 wherein the second fabric is a knit, open mesh fabric.

25. The method of claim 21 wherein the second fabric is adhered to the first fabric along margins of the main body portion and in regions on opposite sides of the withers of the horse.

26. The method of claim 25 wherein the second fabric is a knit, open mesh fabric.

27. The method of claim 20 wherein the anti-rub device includes a forward marginal region surrounding the horse's neck and a rear marginal region surrounding the girth of the horse in a region forwardly of the horse's abdomen, immediately behind the forelegs of the horse, to thereby prevent the garment from undesirably shifting on the horse and thereby adversely affecting the tight fit necessary to protect the horse from the relative movement of a horse blanket.

* * * * *

UNITED STATES PATENT AND TRADEMARK OFFICE
CERTIFICATE OF CORRECTION

PATENT NO. : 4,955,182

DATED : September 11, 1990

INVENTOR(S) : Newman, Marlene

It is certified that error appears in the above-identified patent and that said Letters Patent is hereby corrected as shown below:

At [54] and col. 1, line 1,

ANT-RUB DEVICE AND METHOD FOR
    PROTECTING A HORSE'S COAT FROM
    DAMAGE FROM A HORSE BLANKET should be     ANTI-RUB DEVICE AND METHOD FOR
    PROTECTING A HORSE'S COAT FROM
    DAMAGE FROM A HORSE BLANKET Signed and Sealed this Thirty-first Day of December, 1991

Attest:

HARRY F. MANBECK, JR.

*Attesting Officer*      *Commissioner of Patents and Trademarks*